United States Patent
Izsak

(10) Patent No.: US 11,593,570 B2
(45) Date of Patent: Feb. 28, 2023

(54) SYSTEM AND METHOD FOR TRANSLATING TEXT

(71) Applicant: CONSUMER LEDGER, INC., Dover, DE (US)

(72) Inventor: Ran Izsak, Yokneam (IL)

(*) Notice: Subject to any disclaimer, the term of this patent is extended or adjusted under 35 U.S.C. 154(b) by 300 days.

(21) Appl. No.: 16/852,742

(22) Filed: Apr. 20, 2020

(65) Prior Publication Data

US 2020/0334421 A1 Oct. 22, 2020

Related U.S. Application Data

(60) Provisional application No. 62/835,923, filed on Apr. 18, 2019.

(51) Int. Cl.
| | |
|---|---|
| G06F 40/58 | (2020.01) |
| G06T 11/20 | (2006.01) |
| G06F 40/47 | (2020.01) |
| G06F 40/56 | (2020.01) |
| G06F 40/49 | (2020.01) |
| G06F 40/263 | (2020.01) |

(52) U.S. Cl.
CPC ............ G06F 40/58 (2020.01); G06F 40/263 (2020.01); G06F 40/47 (2020.01); G06F 40/49 (2020.01); G06F 40/56 (2020.01); G06T 11/20 (2013.01); *G06T 2210/12* (2013.01)

(58) Field of Classification Search
CPC .......... G06F 40/58; G06F 40/40; G06F 40/42; G06F 40/56; G06F 40/53; G06F 40/51; G06F 40/49; G06F 40/47; G06F 40/45; G06F 40/44; G06F 40/55; G06F 40/263
See application file for complete search history.

(56) References Cited

U.S. PATENT DOCUMENTS

| | | | | |
|---|---|---|---|---|
| 2003/0120478 A1* | 6/2003 | Palmquist | ............... | G06F 40/58 715/264 |
| 2003/0200078 A1* | 10/2003 | Luo | ......................... | G06F 40/58 704/2 |
| 2006/0204094 A1* | 9/2006 | Koyama | ................. | G06F 40/58 382/176 |
| 2006/0217954 A1* | 9/2006 | Koyama | ................. | G06F 40/58 704/2 |
| 2006/0245005 A1* | 11/2006 | Hall | ........................ | G06F 40/58 358/448 |
| 2009/0106016 A1* | 4/2009 | Athsani | ................... | G06F 40/58 704/3 |
| 2012/0116750 A1* | 5/2012 | Onishi | .................... | G06F 40/58 704/3 |
| 2013/0211814 A1* | 8/2013 | Derks | .................... | G06Q 50/12 705/15 |
| 2014/0081619 A1* | 3/2014 | Solntseva | ............... | G06F 40/58 704/3 |

(Continued)

*Primary Examiner* — Samuel G Neway

(74) *Attorney, Agent, or Firm* — Alphapatent Associates, Ltd; Daniel J. Swirsky

(57) ABSTRACT

The subject matter discloses a method for translating text in an image, comprising extracting at least a portion of the text in a source language from the image, identifying one or more bounding boxes containing the text in the image, translating at least a portion of the text in the source language to a destination language, generating a new image containing the text in the destination language in the bounding boxes of the associated words in the source language.

15 Claims, 5 Drawing Sheets

(56) References Cited

U.S. PATENT DOCUMENTS

| | | | |
|---|---|---|---|
| 2014/0088951 A1* | 3/2014 | Argue | G06F 40/58 704/2 |
| 2015/0134318 A1* | 5/2015 | Cuthbert | G06F 40/58 715/231 |
| 2015/0310290 A1* | 10/2015 | Cuthbert | G06F 40/58 382/182 |
| 2016/0107577 A1* | 4/2016 | Niles | B60K 37/06 704/8 |
| 2017/0249301 A1* | 8/2017 | Otsuka | G06F 40/51 |
| 2019/0065476 A1* | 2/2019 | Kwon | G06F 3/03545 |
| 2020/0334421 A1* | 10/2020 | Izsak | G06F 40/103 |

* cited by examiner

SYSTEM AND METHOD FOR TRANSLATING TEXT

CROSS-REFERENCE TO RELATED APPLICATIONS

This application claims the benefit of priority from U.S. Provisional Patent Application No. 62/835,923, filed Apr. 18, 2019, the disclosure of which is incorporated herein by reference in its entirety.

FIELD

The present invention relates generally to the field of translation of text.

BACKGROUND

Billions of images are captured each day by users carrying personal electronic devices such as cellular phones, tablets, cameras and the like. These devices are connected to the internet or another communication network. Some of the images are sent to a storage server for storage, such as Amazon Web Services (AWS), Google drive and the like.

Machine translations involve the translation of information from a source language to a destination language via a computing device. Machine translations may be used to translate, for example, advertisements, government documents, academic works, text messages and emails, social networking posts, recordings of spoken language, and numerous other works.

The input provided into the machine translation services is text. This requires users to type words/sentences, which is sometimes inconvenient, especially in case the source language is not common to the user, or the letters themselves are not known or do not appear on the user's keyboard, such as translating Arabic/Chinese/Cyrillic letters to Latin letters.

People travelling to a foreign country wish to translate more words, for example road signs, food presented in stores, menus in restaurants that may include courses including a list of ingredients not familiar to the user, information in museums and the like. Such travelers wish to avoid the cumbersome task of inputting text into their devices in order to understand what these words mean. There is thus a need to enable users to easily translate text extracted from images.

SUMMARY

The intuitive way to input the text from the source language is to capture an image containing the text and have the text translated and sent back to the user's device.

The subject matter discloses a method for translating text in an image. The method enables a user to better understand the content of text, for example in a receipt, menu, guidelines and the like. The method enables users to learn some new words of a new language, by switching between images having the text in the source language and an image containing the text in the destination language.

It is an object of the subject matter to disclose a method for translating text in an image, comprising extracting at least a portion of the text in a source language from the image, identifying one or more bounding boxes containing the text in the image, translating at least a portion of the text in the source language to a destination language, generating a new image containing the text in the destination language in the bounding boxes of the associated words in the source language.

In some cases, the method further comprises assigning a specific bounding box of the one or more bounding boxes to each of the words in the source language, associating words in the destination language with the words in the source language and assigning the specific bounding box to each of the words in the destination language based on the specific bounding box of the associated word in the source language.

In some cases, the method further comprises defining a group of words in the source language and translating the group of words in a single batch.

In some cases, the method further comprises determining a font size of the words in the destination language and placing the words in the destination language in the new image in the determined font size. In some cases, the first font size of text in a first bounding box is different than a second font size of text in a second bounding box. In some cases, translating the image is performed in the device in which the image is captured.

In some cases, the method further comprises sending the image from a user's device to a server over a communication channel, wherein the server translating the text from the source language to the destination language. In some cases, the server generating the new image and sending the new image to the user's device. In some cases, the server sending the words in the destination language and identifiers of bounding boxes associated with the words in the destination language to the user's device, wherein the user's device generating the new image.

In some cases, the method further comprises sending the text in the source language to a server over a communication channel, wherein the server translating the text from the source language to the destination language.

In some cases, the method further comprising displaying the new image in the user's device, identifying at the user's device that the new image is associated with the image containing the text in the source language, receiving a command in the user's device to switch to the image containing the text in the source language and displaying the image containing the text in the source language.

In some cases, the method further comprises identifying a predefined gesture performed by the user and switching a display between the image having the text in the source language and the new image based on the gesture. In some cases, the method further comprising identifying the source language based on a location of the user's device.

In some cases, generating the new image further comprising coloring the bounding boxes to remove the text in the source language and placing the text in the destination language into the bounding boxes. In some cases, the method further comprising receiving a selection from the user for words in the text in the source language to be translated, translating the selected text, and generating the new image to contain text in the source language and text in the destination language based on the selection from the user. In some cases, the method is performed when translating a sequence of images in a video file.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present subject matter discloses a system and method for translating text embedded in an image. The image may be captured by a device held by a user, or captured by another device and displayed on the user's device, for example sent from another device or accessed when the user views a web page or content in a mobile application. The text is translated from a source language to a destination language. The letters in either of the source language and/or the destination language may appear in common letters, for example Latin letters, Arabic, Cyrillic, Chinese, Japanese, Hebrew and the like. The term text comprises words, letters, terms, numbers, signs which can be understood by persons.

The method disclosed below may be performed using a server communicating with the user's device, for example over a cellular network or over the internet. In some cases, the method may be fully performed on the user's device. In such cases, the user's device may comprise a software application for performing the translation from the source language to the destination language as well as the set of rules used to perform the processes disclosed below which are additions to the actual translation.

Figure 1:
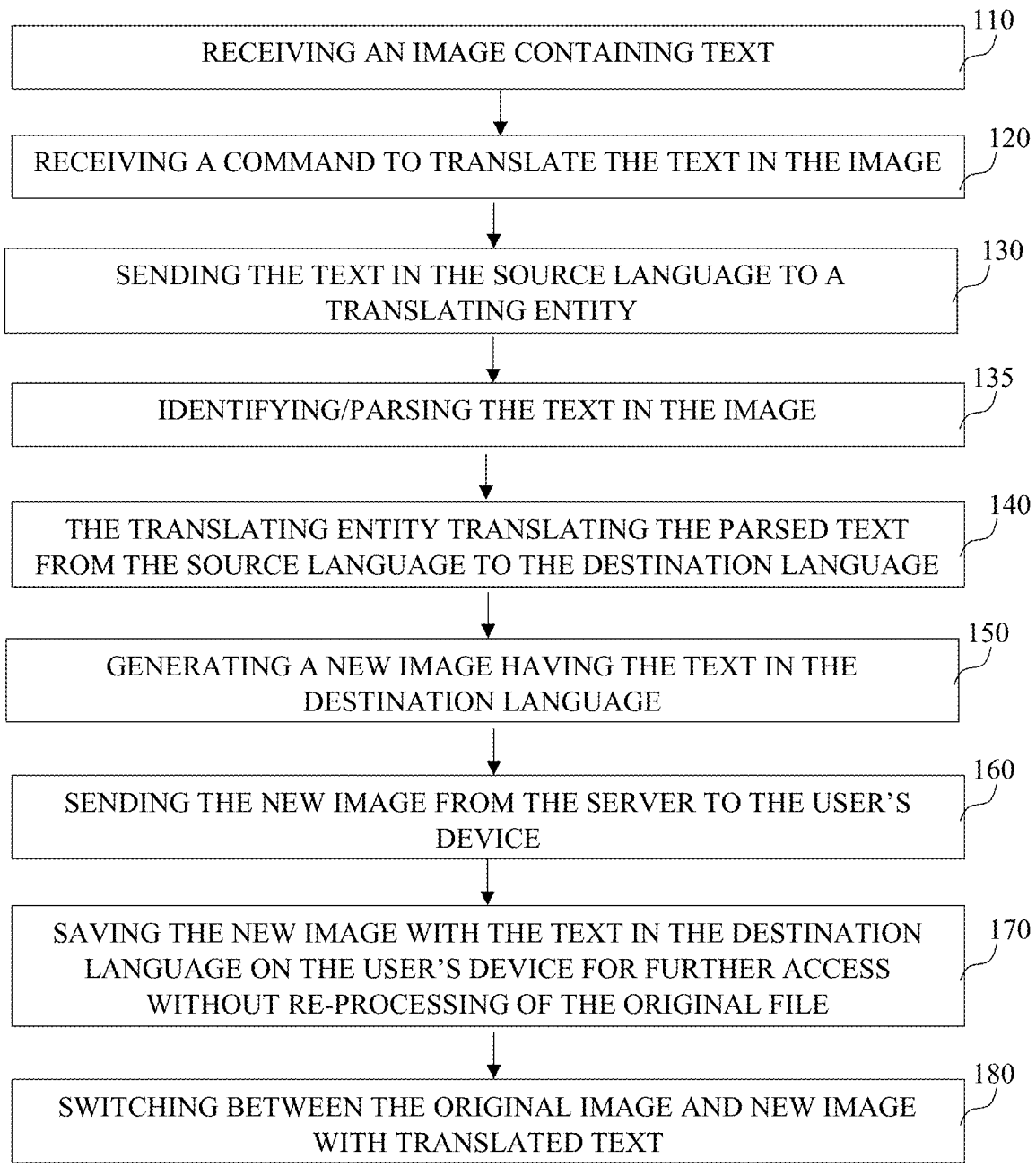
FIG. 1 shows a method for translating text in an image, according to exemplary embodiments of the disclosed subject matter.

FIG. 1 shows a method for translating text in an image, according to exemplary embodiments of the disclosed subject matter.

Step 110 discloses receiving an image containing text. The image may be extracted from a video. The image may be captured by the user's device, or be displayed by an application operating on the user's device, such as a social network application, online storage service, the device image gallery, gaming application, browser, recommendation application and the like. The image may contain text in a single language, defined as a source language, or in multiple languages. The user may choose to translate text in the multiple languages, for example French and Spanish, to English. The destination language may be selected automatically by the user's device or another computerized entity. The translating entity or another application may select a portion of the text in the source language to be translated, based on a set of rules. In some cases, the translating entity or another application may select a portion of the text in the source language to be translated based on the source language. For example, translate text from Spanish but not translate text from French.

Step 120 discloses receiving a command to translate the text in the image. Such command may be inputted by a user of the device, for example when the user presses an area on a touch-operated screen that contains the term "translate".

The command may be provided in an automated manner, based on a set of rules stored in the user's device. For example, when the user's device is in a predefined country, the processing module in the user's device may detect text in the images displayed on the display of the user's device. When the image contains text, the detected text may be analyzed, and in case the text is not in a specific language inputted by the user, the command will be provided.

Step 130 discloses sending the text in the source language to a translating entity. The translating entity may receive the image with the text, or only the text extracted from the image. In some cases, sending may be defined as activating the translating services, for example using a software application connected to an API of the translating servers. The translating entity may be an online server communicating with the user's device, or a computerized application running locally at the user's device, either software, hardware or firmware. Sending may be performed over the internet or another communication network, or by informing the computerized application running locally at the user's device that the text is stored in a specific memory address and can be accessed by the translating entity.

Step 135 discloses identifying/parsing the text in the image. Parsing may be done prior to sending the text to the translating entity, in case the image itself is not sent. When the entire image is sent to the server, such as Google Cloud or AWS, acting as the translating entity, parsing is performed at the server, after the image is sent thereto. Parsing may include extracting the bounding boxes in which the text is located in the image. In some cases, each of the words in the text may be assigned a specific bounding box. For example, word #1 is assigned box #1, words #2-#5 are assigned box #2 and the like. Identifying the text may be performed using an object character recognition (OCR) technique, receiving at least a portion of the image as input. Parsing the text may include identifying capital letters, the font type, font color and font size.

Identifying the text in the image may include identifying text in multiple source languages, such as Spanish and English in the same menu of a restaurant, while the destination language is German. The translating entity may determine to translate the text only in English, which is more similar to German.

The method may also include extracting metadata from the image. Such metadata may include coordinates of the bounding boxes that contain the text in the source language. The metadata may later be used to remove the bounding boxes, if so required by the user. The metadata may be sent to the user's device in addition to the new image, and can later be used to enable manipulations on the new image, such as zoom-in, while maintaining the coordinates includes in the metadata. The metadata may include the text in the destination language, for example in case the server translated the text, the server generates the new image and sends the new image with the translated text in a separate manner, for example a separate file or message.

Step 140 discloses the translating entity translating the parsed text from the source language to the destination language. Such translation may be performed based on a predefined set of logical rules, as elaborated below. That is, in some exemplary cases, not all the text in the source language is translated. For example, a first group of the words in the text are marked as "translate" and a second group of the words in the text are marked as "not translate".

The destination language can be configured or pre-set. It can be also chosen based on the user's location, in case the location can be extracted (e.g. by a phone's GPS or by the connection of the user to the internet). In some cases, multiple optional destination languages can be offered, and the user can select a desired destination language, for example by inputting text or pressing a location on the display of the user's device. In some cases, multiple destination languages can be and the text in the source language may then be translated to the multiple destination languages.

Step 150 discloses generating a new image having the text in the destination language. The new image comprises the non-textual areas from the original image as received in step 110. The new image also comprises the text in the destination language that appears in the same area of the textual area of the received image. In some cases, the font size of the text in the destination language may be adjusted relative to the font size in the source language, to be displayed in the textual areas in which the text appeared in the image. The font size may differ between different bounding boxes in the new image. When the new image is generated at the server, and the server receives the image containing the text in the source language as input, the server extracts the text from the image and extracts the bounding box associated with each item of the text. In some cases, the server extracts the text and the bounding box associated with each item in the text, translates the text and sends the translated text to the user's device. This way, the user's device generates the new image based on the translated text and the bounding box coordinates received from the server.

Step 160 discloses sending the new image from the server to the user's device. This step is optional and may be performed in case the translation entity is external to the user's device. In some cases, the server sends the text in the destination language to the user's device, and the user's device generates the new image based on the original image, as received in step 110, and the translated text provided by the server. The server may also send the bounding box identifier associated with each of the words or terms in the destination language.

Step 170 discloses saving the new image with the text in the destination language on the user's device for further access without re-processing of the original file. The new image may be saved in a memory address allocated for displaying images containing translated text. In some cases, images containing translated text may be accessed via the gallery where all the images are accessed and browsed. In some cases, the images containing translated text may be accessed in a specific application operating on the user's device.

Step 180 discloses switching between the original image and new image with translated text, for example based on predefined gesture or command. Such switching may be performed by pressing a predefined area in the images, based on an audio command detected by a microphone of the user's device, by a physical gesture performed by a person and captured by a camera or by sensors in the device, for example on the device's screen. In some exemplary cases, the user's device may detect gestures performed by the user, for example by hovering on the display or by capturing the user's movements by camera, and replace the text in the image from the source language to the destination language and vice versa. The gesture may be detected by another device, such as a camera, communicating with the user's device, and informing the user's device that the gesture was detected. Such replacement may be in a specific bounding box, multiple bounding boxes or the entire text in the image. The gesture may resemble a person's movement when peeling a sticker.

The subject matter also discloses detecting a gesture performed by a person. The gesture is detected by a sensor communicating with the user's device. The gesture includes detecting two taps or touches on or near a corner of a rectangle identified as a bounding box that contains text, either in the source language or in the destination language. The person's touch can be defined with a small motion in a direction inside the rectangle identified as a bounding box.

Then user can drag (with or without leaving and retouching after the second touch) a rectangle to remove the text appearing in the rectangle, in a manner that resembles removing a sticker. In some cases, the gesture may include partially removed with the user's touch. Alternatively, the rectangle can move in the direction of the drag. A possible variation of the gesture comprises detecting, after the second touch, that the user touches the display with two fingers one near the other to start removing the rectangle. When moving/removing a rectangle one can show the original text of the image.

In some cases, the method is performed by multiple servers. For example, the first server receives the image, extracts the text and identifies the bounding boxes for each part of the text, and another server, such as AWS or Google's server, translates the text from the source language to the destination language.

Figure 2:
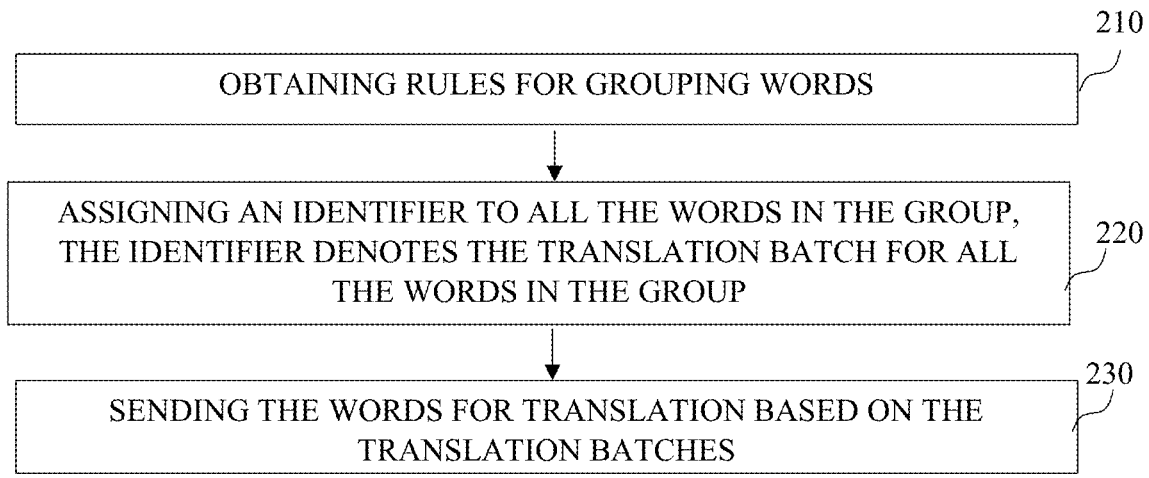
FIG. 2 shows a method for grouping words when translating text in an image, according to exemplary embodiments of the disclosed subject matter.

FIG. 2 shows a method for grouping words when translating text in an image, according to exemplary embodiments of the disclosed subject matter.

Step 210 discloses obtaining rules for grouping words. Said rules may be stored in a translation server, a server analyzing the text prior to the translation, or in the user's device. Such rules may be, for example "when there are two or more commas between words, identify the words as a list and group all the words in the list". Such words may be options for sauces in a pasta restaurant, list of museums in the city center, list of persons and the like.

Step 220 discloses assigning an identifier to all the words in the group, the identifier denotes the translation batch for all the words in the group. For example, some words appearing in the image may be translated separately, while other words may be translated as a group, for example as assembling an expression, and cannot be understood separately. As such, word #1 is in batch #1, word #2 is in batch #2, words #3-6 are in batch #3 and word #7 is in batch #4.

Step 230 discloses sending the words for translation based on the translation batches. Such sending may be via messages sent to other devices, or by storing the words in the batch in predefined memory addresses in the user's device and sending a command to the translation entity to translate the words in the batch.

Figure 3:
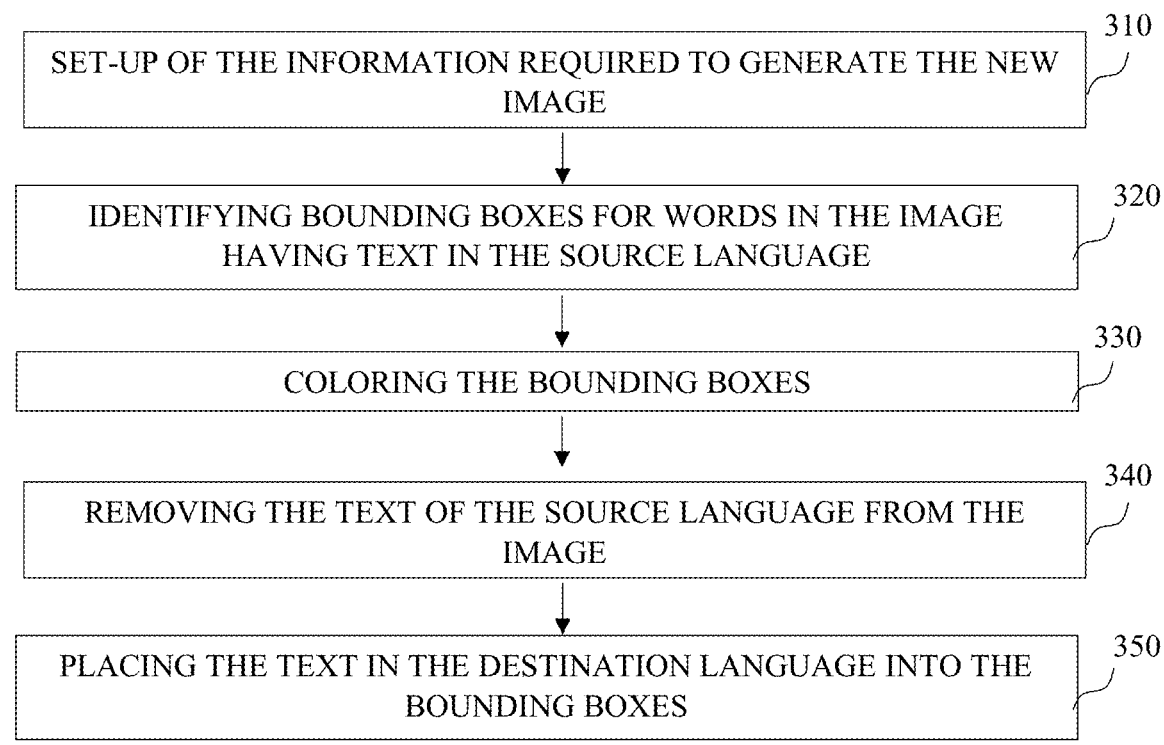
FIG. 3 shows a method for generating an image containing the translated text, according to exemplary embodiments of the disclosed subject matter; and, FIG. 4 shows a system for translating text in an image, according to exemplary embodiments of the disclosed subject matter.

FIG. 3 shows a method for generating an image containing the translated text, according to exemplary embodiments of the disclosed subject matter.

Step 310 discloses set-up of the information required to generate the new image. The generation of the new image with the translated text begins with receiving the image with the text in the source language. In addition, the entity generating the new image also receives the destination language, either as an input from the user or based on information such as the location of the user's device.

Step 320 discloses identifying bounding boxes for words in the image having text in the source language. Such bounding boxes may be defined as coordinates in the image. The bounding boxes may be identified based on margins around the text detected using OCR, for example 2 millimeters above, below and sideward from the letters. In some exemplary cases, each word in the text in the source language may be assigned an index, such as word #1, word #2 etc., each of the words is associated with a bounding box. For example, words #1-#3 are inside bounding box #1 and words #4-#11 are inside bounding box #2.

Step 330 discloses coloring the bounding boxes. Coloring the bounding boxes may be used to improve the visibility of the text in the destination language. Coloring the bounding boxes may be performed in order to provide a background to the text in the destination language. In some cases, the background may be in a color inputted by the user, or in a color contradicting with the color in which the text of the destination language is provided into the new image. For example, black bounding boxes and white text.

Step 340 discloses removing the text of the source language from the image. Removing the text in the source language may be performed by coloring the entire bounding boxes that contain the text in the source language.

Step 350 discloses placing the text in the destination language into the bounding boxes. The text size and font type may be adjusted based on the size of the bounding box and the number of characters in the text in the destination language. For example, the text in the source language includes 12 characters in font size 14 and the text in the source language includes 19 characters, the font size of the text in the destination language may be reduced. In some cases, the entity generating the new image may decide to expand the size of the bounding box, for example in case the areas surrounding the bounding box in the image does not add information, for example showing the sky. Expanding the size of the bounding box may be determined based on a predefined set of rules, for example in case the text in the destination language dictates a font smaller than a threshold, such as font size 8.

Figure 4:
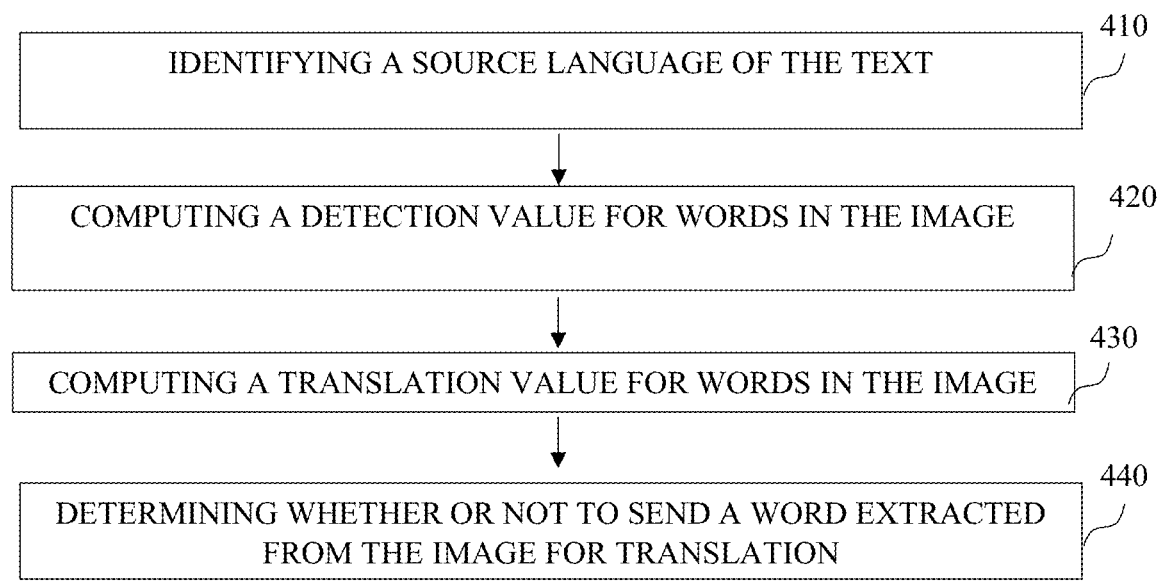

FIG. 4 shows a method for applying business logics on text when translating text in an image, according to exemplary embodiments of the disclosed subject matter.

Step 410 discloses identifying a source language of the text. The source language may be determined by checking whether or not the word appears in a dictionary of a certain language. When the word appears in more than one dictionary, the business logics may consider secondary information, such as the location of the user's device, whether or not the other words also appear in the dictionaries and the like. In case the word is in the destination language, it may not be sent to the translation entity, to prevent a case in which the translation entity outputs another word by mistake.

Step 420 discloses computing a detection value for words in the image. The detection value indicating the level of certainty that the word was identified correctly from the image, for example based on the OCR. The detection level may be based on other optional words that appear in the image.

Step 430 discloses computing a translation value for words in the image. The translation value indicating the level of certainty that the word will be translated correctly from the source language to the destination language. In some cases, a word or expression are unique to the source language. As such, translating the word will not assist the user in understanding the word's meaning.

Step 440 discloses determining whether or not to send a word extracted from the image for translation. Such determination may be based on the translation value and the detection value of the word. In some cases, when the word is part of a group, the word is more likely to be sent to the translating entity.

Figure 5A:
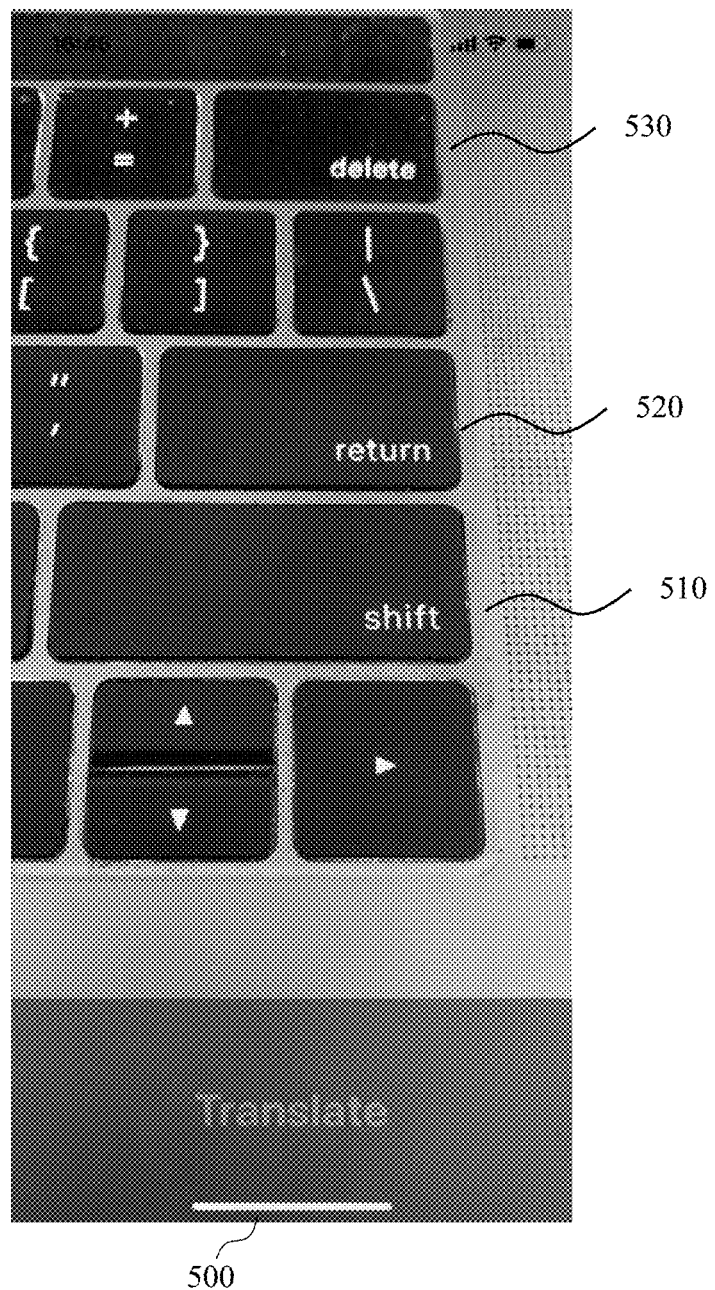
FIGS. 5A-5B show an image containing text in a source language and an image containing text in a destination language, according to exemplary embodiments of the disclosed subject matter.
Figure 5B:
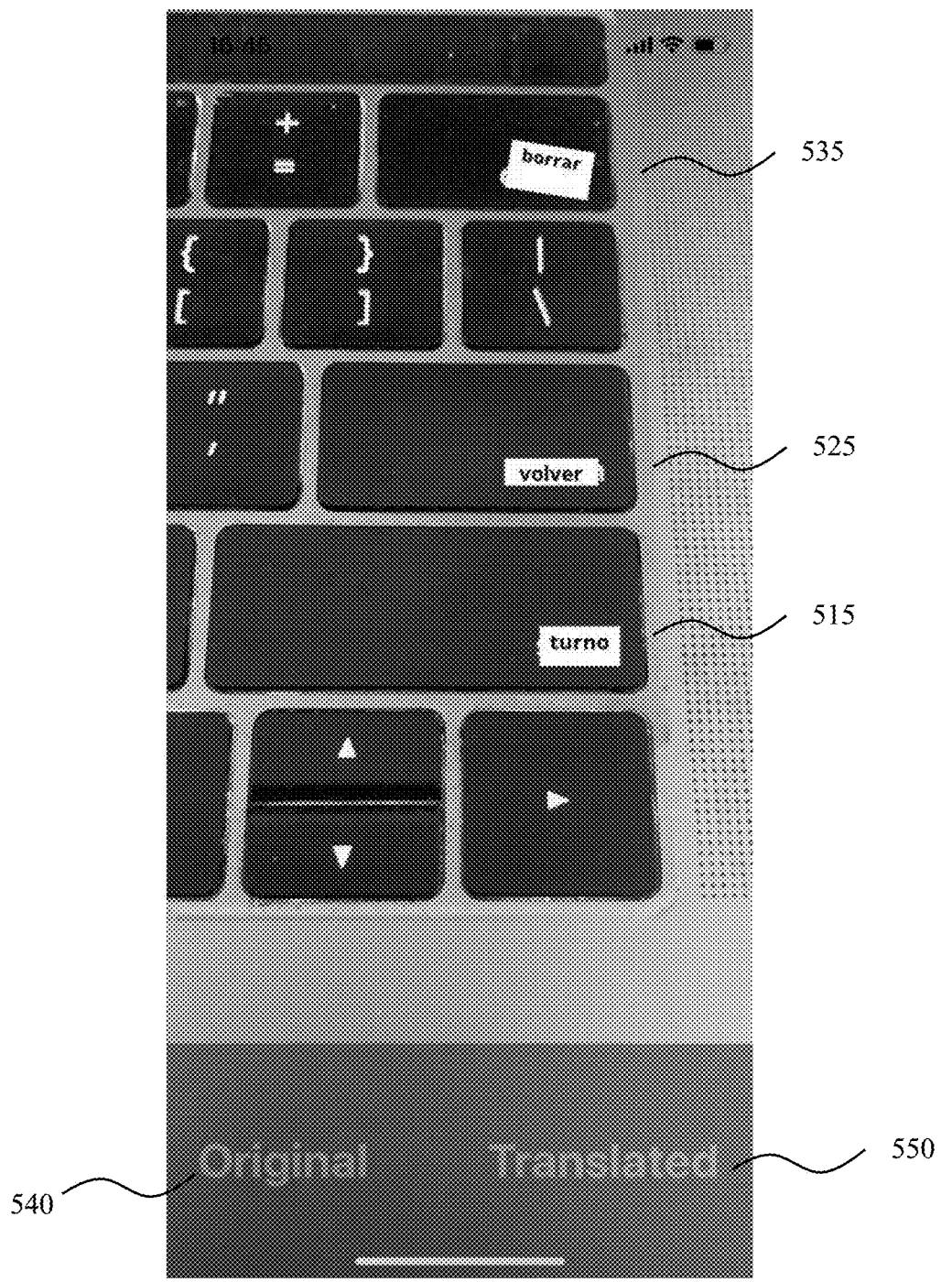

FIGS. 5A-5B show an image containing text in a source language and an image containing text in a destination language, according to exemplary embodiments of the disclosed subject matter. The image shown in FIG. 5A is displayed above a bottom area 500 in the display that contains the term "translate". The term "translate" may be automatically displayed when an image is shown in the user's device's display. Once the user presses or taps the area 500, the text in the image is sent to the translating entity. The text in the image appears in bounding boxes 510, 520 and 530. Each word or group of words are associated with a specific bounding box. When the words in the destination language are received from the translating entity, they are placed in bounding boxes 515, 525 and 535, respectively, as shown in FIG. 5B.

After the image containing the text in the destination language is displayed, the user may switch between the original image, as shown in FIG. 5A, and the new image, as shown in FIG. 5B. The display in the user's device may include a single area containing a term such as "switch to text in other language" or two areas, such as area 540 and area 550. When the user presses or taps area 540, the original image is displayed and when the user presses or taps area 550 the new image with the translated text is displayed.

It should be noted that the user may mark only some of the text in the original image, for example by marking areas associated with bounding boxes, and then presses or taps the area indicating that the image is sent to translation. Then, only the text associated with the marked area is translated and the new image contains text in the source language in the bounding boxes not marked by the user and text in the destination languages in the bounding boxes marked by the user.

The user may manipulate the image prior to choosing whether or not to translate it. The user may manipulate the new image containing the text in the destination language. Such manipulation may include zooming-in, tilting the image, pan & pinch and the like. When switching between the original image containing the text in the source language and the new image containing the text in the destination language, the manipulation performed on one of the images may also apply on the other one.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method for translating text in an image, the method comprising:
   identifying in an original image one or more bounding boxes containing text in a source language;
   translating at least a portion of the text in the source language to a destination language;
   generating a new image containing text in the destination language in the one or more bounding boxes;
   displaying the new image;
   manipulating the new image in response to a user command;
   switching a display between the new image and the original image, in response to a gesture performed by the user; and applying on the original image a same manipulation as the new image.

2. The method of claim 1, wherein translating at least a portion of the text in the source language to a destination language is performed in a device in which the original image is captured.

3. The method of claim 1, wherein translating at least a portion of the text in the source language to a destination language is performed at a server, the server generating the new image and sending the new image to a user's device.

4. The method of claim 1, wherein translating at least a portion of the text in the source language to a destination language is performed at a server, the server sending words in the destination language and identifiers of bounding boxes associated with the words in the destination language to a user's device, wherein the user's device generates the new image.

5. The method of claim 1, wherein generating the new image comprises coloring the one or more bounding boxes to remove the text in the source language and placing the text in the destination language into the one or more bounding boxes.

6. The method of claim 5 comprising coloring the one or more bounding boxes with a color contradicting with a color of the text of the destination language, to provide a background to the text in the destination language.

7. The method of claim 5 wherein a color of the one or more bounding boxes is inputted by a user.

8. The method of claim 1, further comprising receiving a selection from the user for words in the text in the source language, translating only the words in the selection, and generating the new image to contain text in the source language and text in the destination language based on the selection from the user.

9. The method of claim 1, further comprising expanding a size of the bounding box in the new image.

10. The method of claim 1, wherein the original image contains text in multiple source languages.

11. The method of claim 1 comprising saving the new image on a user's device and accessing the new image via an application operating on the user's device.

12. The method of claim 1 wherein the manipulating comprises one or combination of zooming-in, tilting and pinch and pan.

13. The method of claim 1 comprising parsing the text in the source language in the original image prior to translating at least a portion of the text.

14. The method of claim 13 comprising parsing the text in the source language by assigning words in the source language to specific bounding boxes.

15. The method of claim 13 comprising translating parsed text in the source language based on a predefined set of logical rules.

\* \* \* \* \*